UNITED STATES PATENT OFFICE.

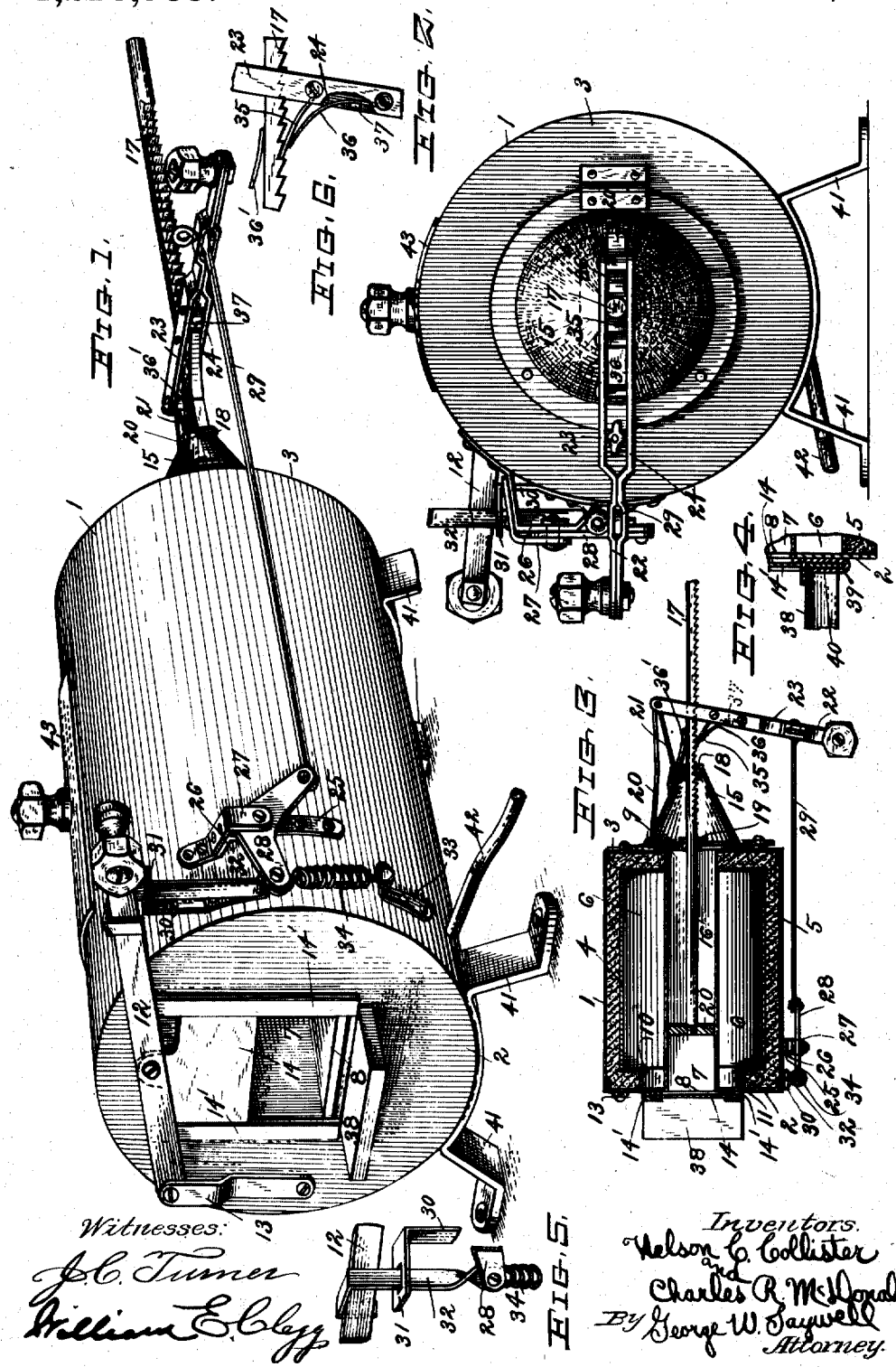

NELSON C. COLLISTER, OF CLEVELAND, AND CHARLES R. McDONALD, OF EAST LIVERPOOL, OHIO, ASSIGNORS, BY MESNE ASSIGNMENTS, TO ARTHUR LEICH AND J. BERNER, OF MILWAUKEE, WISCONSIN.

ICE-CREAM MACHINE.

1,218,985.  Specification of Letters Patent.  Patented Mar. 13, 1917.

Application filed February 1, 1915. Serial No. 5,426.

*To all whom it may concern:*

Be it known that we, NELSON C. COLLISTER and CHARLES R. McDONALD, citizens of the United States, and residents of Cleveland, county of Cuyahoga, and East Liverpool, county of Columbiana, respectively, and State of Ohio, have invented new and useful Improvements in Ice-Cream Machines, of which the following is a specification.

Our invention relates to ice cream machines, and particularly to such machines which are adapted to make a special ice cream confection known as ice cream sandwiches. More particularly, our invention relates to such machines which are portable, provided with very efficient ice retaining or insulating means, and adapted to so operate as to automatically feed the ice cream forward a predetermined amount with each actuation of the means adapted to cut or slice the cream.

The annexed drawing and the following description represent means illustrating one form of our invention, such disclosed means representing, however, only one of the possible ways in which the spirit of our invention may be utilized.

In said annexed drawing:

Figure 1 is a perspective view of our improved ice cream machine; Fig. 2 is a rear elevation of the same; Fig. 3 is a horizontal sectional view upon a reduced scale; Fig. 4 is a broken vertical sectional view showing connection between the front platform and the front wall of the ice and ice cream chambers; Fig. 5 is a broken detail showing the relations of the knife and the angular arm adapted to be actuated by the knife and effect the feeding forward of the ice cream a predetermined amount; and Fig. 6 is a broken detail showing the relations between the feed bar, the dog for forcing the same forward, and the springs acting upon said feed bar and said dog.

Referring to the annexed drawing, our improved ice cream machine comprises an outer metallic jacket 1 provided with front and rear end walls 2 and 3, respectively. An inner metallic jacket 4 is provided and between said jackets 1 and 4 is disposed and packed an insulation 5, preferably finely divided cork. Contained within the jacket 4 is the ice chamber 6, and the central cream chamber 7 provided with openings 8 and 9 at either end in the front and rear end walls 2 and 3, respectively. Said cream chamber 7 intersects the rear of inner jacket 4 as shown, but at the forward end of said cream chamber, the insulation 5 is not disposed immediately adjacent said cream chamber but is disposed an inch or two from the same completely around said front end of said cream chamber as shown at 10 and 11, Fig. 1. A knife arm 12 is pivoted to a rocking arm 13 secured to the front wall 2, said knife arm 12 carrying knife 14 adapted to slide in grooved brackets 14¹ across the open end 8 of the cream chamber 7. A conical rear cap 15 is hinged to the rear wall 3 and is adapted to cover the rear open end 9 of the cream chamber 7, as plainly shown in Fig. 3. A rod 16 with notched outer end 17 journaled in bushings 18 and 19 and carrying a plunger 20 is adapted by its forward actuation to force ice cream forwardly through said cream chamber 7 and out of the open end 8 of said chamber. Rigidly secured to said conical end 15 is a supporting member comprising the two arms 20 and 21, and pivoted to said member is the member 22 comprising the two arms 23 and 24, said member 22 being intersected by the rod 16 intermediate of said parts 23 and 24, as plainly shown in Fig. 2. Forwardly of the machine a bracket 25 is secured to the outer jacket 1 and pivoted between the members 26 and 27 of said bracket is a rocking triangular arm 28 which is connected to the member 22 by the rod 29. Also secured to the outer metallic jacket 1 is another bracket 30 provided with an outwardly extending portion 31 which is intersected by an angular member 32 secured at its lower end to the forward end of the rocking arm 28. Fixedly secured to the outer metallic jacket 1 and disposed below the bracket 30 is a small hooked bracket 33, Fig. 1, to which is secured one end of a spring 34, the other end of which is secured to the forward end of said rocking arm 28.

Referring now to the rear of the machine again, a dog 35 is pivotedly secured to the member 22 intermediate the arms 23 and 24 thereof, said dog being so disposed as to effect the forward movement of the rod 16 the predetermined distance between two contiguous notches of said rod upon the forward actuation of said member 22. A spring 36 is adapted to hold the forward end of said dog 35 in said notches in the rod 16, said spring being secured to the member 22 intermediate the arms 23 and 24 and to the rear of the lug 37 which is secured to the arm 24 of the member 22. A spring 36¹ is provided which is secured to the cone 15 and presses upon the rear side of the bar 16 which pressure, in conjunction with the pressure of the dog 35 and the spring 36, keeps said bar in proper alinement in the bushings 18 and 19.

Front platform 38 is provided which is easily attached and detached by reason of its being secured to the front wall 2 by means of a groove 39 provided in a bracket 40 secured to said front wall 2. Legs 41 and drain pipe 42 are provided, as plainly shown in Figs. 1 and 2. A double jacketed, cork insulated cover 43 is provided through which the ice is fed into the ice chamber 6.

It will be apparent from the foregoing description that the cream contained in the cream chamber 7 will be retained very satisfactorily in a firm condition by reason of the refrigeration effected in the ice chamber 6 which refrigeration is maintained by the double jacketed, cork insulated wall of the machine. It is further evident that the lifting of the knife bar 12 to an extent to contact with the bent end of the arm 32 will effect the upward movement of the forward end of the triangular arm 28 and the forward movement of the rear end thereof which in turn will pull the member 22 forward, thus effecting through the dog 35 the forward movement of the rod 16. Upon the downward actuation of said knife bar 12, the spring 34 will effect the contrary movements, respectively, of the forward and rear ends of the triangular arm 28 which will effect the rear movement of the member 22 and the dog 35, the spring 36 being of such a tension as to allow the dog 35 to ride up one of the notches of the rod 16 and effect its dropping into the bottom of the next notch. The sizes of the different elements and the disposition of the parts is such, of course, to effect the forward movement of the rod 16 exactly one notch, and also the retraction of the dog 35, when the knife bar 12 is dropped, exactly one notch. The action then is that of a progressive movement of the cream, which is preferably a brick of very firm cream, through the cream chamber 7, the knife 14 playing across the forward opening 8 to cut off the cream that emerges from the chamber 7, the cutting action and the forwardly feeding action alternating. The cream is cut on to wafers or biscuits disposed upon the platform 38 and the incorporation of which with the cream produces the ice cream sandwich. The handle upon the member 22 is provided for the purpose of manually feeding the cream forward in case for any purpose the automatic feed action of the same is not utilized.

Attention is also directed to the fact that by providing a manual grip in connection with the feed arm 22 and also means connecting this feed arm with the cutter arm, that the apparatus is capable of manually feeding the material independent of the cutting mechanism, or they may be operated conjointly to perform their respective feeding and cutting functions. Thus, if it is desired to operate the parts independently, a greater or less bulk of material can be fed and severed independently after being fed, or if it is desired to feed a pre-determined quantity each time, the feed and cutting mechanisms being connected, this positive predetermined quantity can be assured.

It is noted that the cutter arm 12 does not engage the normally depressed hook portion of the bar 32 until the lower edge of the cutter 14 has passed the top of the casing 7, and that the operative movement of the feeding mechanism incidental to continued upward movement of the cutter arm consequently occurs without interference by the cutter plate. In manually actuating the feeding mechanism, the cutter arm is held in such position as to clear the knife at the front end of the casing, and also to lie below the lowermost limit of movement of the hook bar 32. It is thus obvious that manual and automatic actuation of the feeding mechanism may be selectively employed at will without necessitating any adjustment of the connections between the various parts.

Having thus shown and described our invention, what we claim and desire to secure by Letters Patent is:

A machine of the described character comprising an open-ended casing, a longitudinally reciprocated plunger fitted therein, a toothed feed-bar extending from the plunger beyond one end of the casing, a feed-arm carrying a pawl engageable with the teeth of the feed-bar, the feed-arm being provided with a manual grip, a reciprocative cutter in sliding engagement with the open end of the casing, a manually operated actuating arm for the cutter and means connecting the cutter arm and feed arm whereby they may be operated conjointly or independently to perform their respective feeding and cutting functions.

In testimony whereof, we have subscribed to this specification this 30" day of January, 1915.

NELSON C. COLLISTER.
CHARLES R. McDONALD.

Witnesses:
WILLIAM E. CLEGG,
G. E. MOSHER.